United States Patent [19]
Riener et al.

[11] Patent Number: 5,936,804
[45] Date of Patent: Aug. 10, 1999

[54] IMPACT FEATURES ON SUSPENSIONS FOR IMPROVED DAMAGE RESILIANCY IN DISK DRIVES

[75] Inventors: Timothy A. Riener, Fremont; Stephen P. Williams, Morgan Hill, both of Calif.

[73] Assignee: Quantum Corporation, Milpitas, Calif.

[21] Appl. No.: 08/978,857
[22] Filed: Nov. 26, 1997
[51] Int. Cl.⁶ .................................................. G11B 5/48
[52] U.S. Cl. ................................................... 360/104
[58] Field of Search .............................................. 360/104

[56] References Cited

U.S. PATENT DOCUMENTS 5,027,241  6/1991  Hatch et al. ............................ 360/105
5,065,268  11/1991  Hagen ..................................... 360/104
5,239,431  8/1993  Day et al. .............................. 360/98.08
5,543,985  8/1996  Donnelly et al. ....................... 360/104

Primary Examiner—A. J. Heinz
Attorney, Agent, or Firm—John C. Chen

[57] ABSTRACT

In a disk drive unit having disk clamp/spacer/hub flanges, impact protrusion features extend from an end of a load beam to limit slider displacement from disk surface. The impact features also compensate for stack-up of the E-block arm such that potential interference and collision between the suspension and flange is minimized, if not eliminated, thereby reducing the risk of generating debris. The impact features are etched and formed with the stiffening rails of an up-rail suspension while a dimple is formed onto a back side of the down rail or rail-less suspension, in a direction away from the slider.

17 Claims, 12 Drawing Sheets

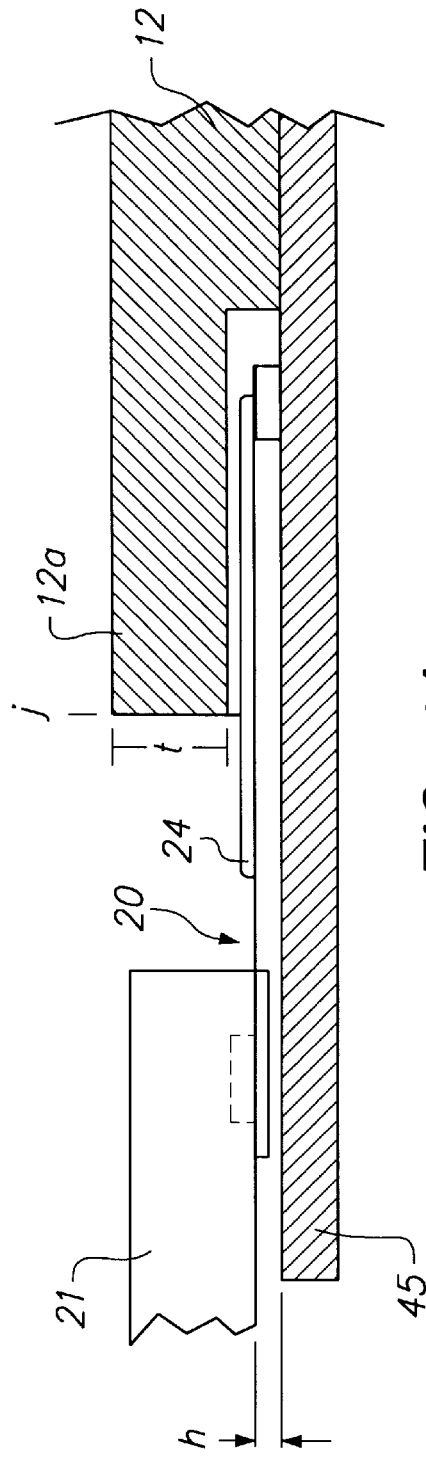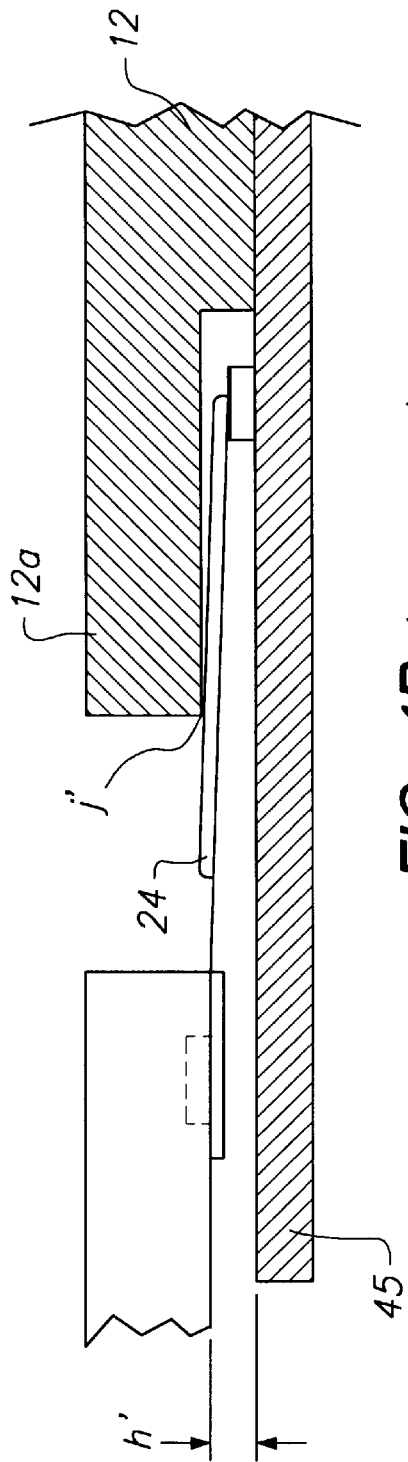
FIG. 4A (PRIOR ART)
FIG. 4B (PRIOR ART)

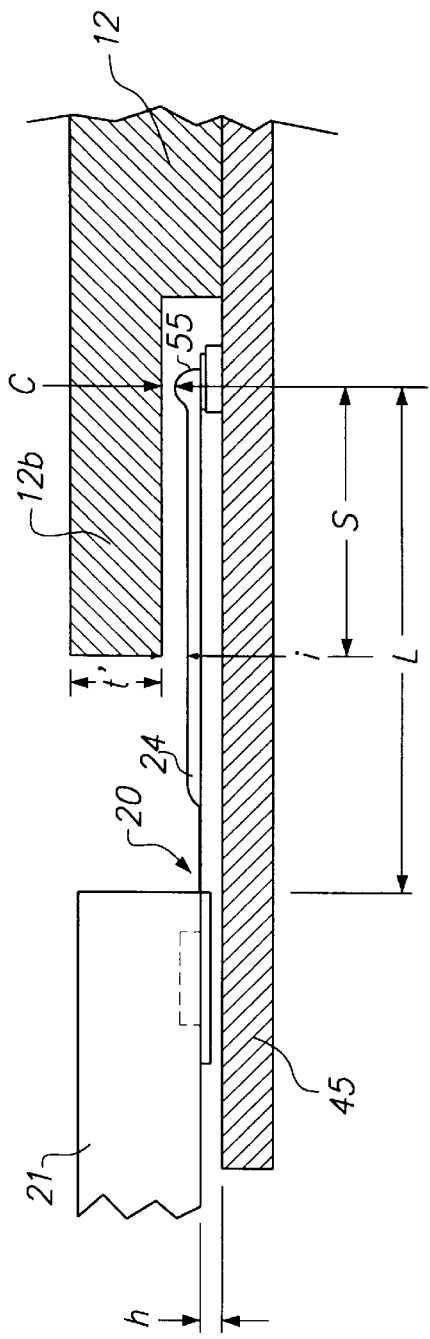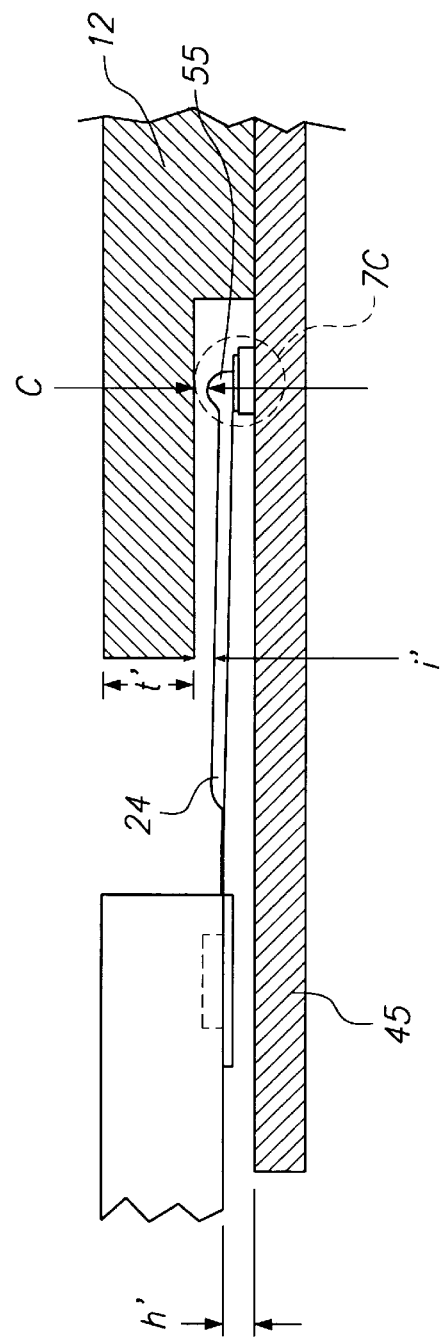

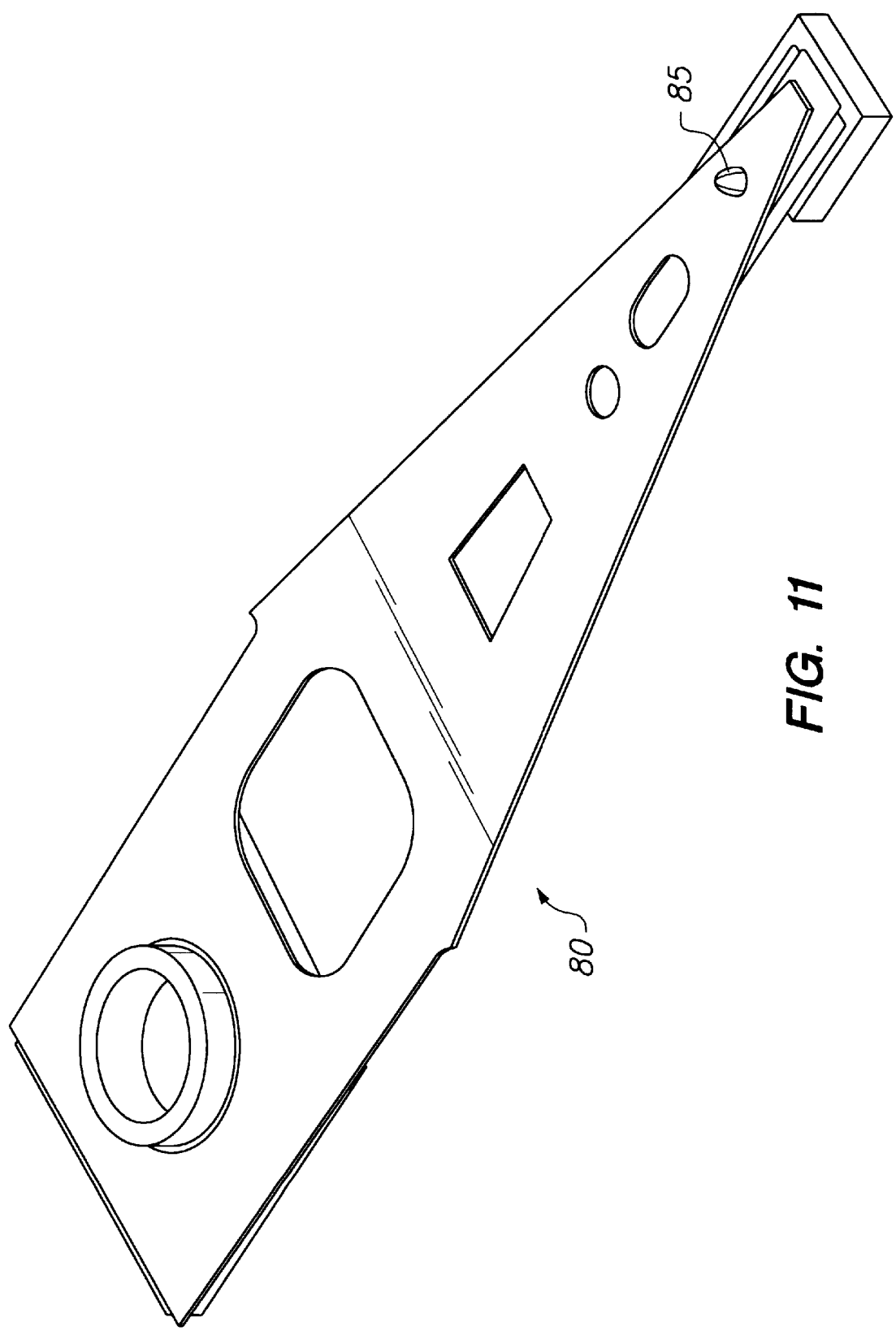

IMPACT FEATURES ON SUSPENSIONS FOR IMPROVED DAMAGE RESILIANCY IN DISK DRIVES

FIELD OF THE INVENTION

This invention relates generally to a suspension arm assembly for supporting a read/write head carrying slider adjacent to a relatively moving recording medium in a disk drive. More particularly, it relates to a suspension arm assembly that is especially well suited for supporting a slider at an end of a load beam, wherein the load beam includes impact features which limits displacement of the slider from the disk surface.

BACKGROUND OF THE INVENTION

As shown in FIG. 1a, a hard disk drive 5 conventionally includes at least one rotating data storage disk 45. Frequently, but not necessarily, a plurality of disks 45 is mounted on a common rotating spindle 9 to which rotational force is imparted by a suitable spindle motor 13. Each data storage disk 45 is provided with an associated transducer carrying slider 29 which "flies" in close proximity to the rotating data storage surface in accordance with so-called "Winchester" technology so as to write data to the surface and read data previously written to the surface. As shown in FIG. 1b, each slider 29 makes point contact to the load beam 20 by a load dimple 19, the combination of which makes a gimbal assembly forming part of a rotary actuator assembly which positions the suspension over the rotating disk.

As shown in FIG. 2, a load beam 20 typically includes a swaging boss 22 which is in turn attached by conventional ball-swaging to an actuator E-block. The load beam 20 also includes a spring section 23 and a relative rigid section. The rigid section may have longitudinal side rails. The stiffening side rails may be formed either away from the slider 29, as shown in FIG. 2, as "up-rails" 24, or towards the slider 29, as shown in FIG. 3, as "down-rails" 28. Typically, rails are approximately 0.2–0.3 millimeters in height. One exemplary down-rail load beam design is disclosed and characterized in commonly assigned U.S. Pat. No. 5,027,241 to Hatch et al., entitled, "Data Head Load Beam for Height Compacted, Low Power Fixed Head and Disk Assembly".

Each load beam 20 projects between a pair of data storage disks 45, as shown in FIG. 1, and positions the slider 29 at predefined concentric data tracks on each disk surface. During operation, the rotary actuator assembly positions the slider 29 at a substantially constant distance away from the disk surface, commonly referred to as the "flying height". A preload force formed into the load beam 20 and coinciding at the load dimple 19 biases the slider 29 towards the disk surface and against an aerodynamic "lifting" force generated by the spinning disk to maintain a relatively constant flying height. When the disk drive is not in operation, the rotary actuator assembly typically moves the slider 29 to a "parked" position at a landing zone, relatively adjacent the spindle. Alternatively, the rotary actuator assembly may move the load beam from a position between the disks 45 to a radial location beyond the edge of the disks 45 onto a parking ramp (not shown), located radially adjacent the edge of the disk 45.

Disk drives are designed to withstand the shock forces which are usually encountered in a normal operational environment, but when being handled or moved, shock forces from bumping and dropping, in the absence of suitable restraints, may result in damaging displacement and/or collisions of the structural parts. One example is "head slap", wherein the slider is displaced away from the disk surface, causing the slider to detrimentally collide with the disk.

In seeking to make disk drives more resilient to shock force damage, disk drive manufacturers have looked to various designs and means to limit or eliminate such damages. For example, U.S. Pat. No. 5,239,431 discloses a device for limiting slider displacement from a disk surface by extending a annular flange around a disk spacer, over the parking zone. An illustration of a flanged spacer 14a is shown in FIG. 1a. Also shown is a flanged disk clamp 12 and a flanged motor hub 15.

The drawback of these flanged spacers is that tolerances introduced during the manufacturing and assembly of the drive cause vertical misalignment ("stack-up") between the disks and the actuator E-block arms. Stack-up commonly leads to collision and interference between the load beam and flange. The inventors of the present invention have found that a nominal clearance of approximately at least 0.20 mm. between the flange and load beam is required to sufficiently avoid interference and collision thereabout. A nominal clearance j, between an up rail 24 of load beam 20 and flange 12a is represented in FIG. 4a. FIG. 5a, similarly, shows a nominal clearance k between a down rail 28 and flange 12b. However, with manufacturing and assembly tolerances and vertical misalignments, clearance is reduced to j' and k', and in a worst case, can result in contact between the load beam and the flange, as illustrated in FIGS. 4b and 5b. Such collisions may produce debris, possibly resulting in catastrophic failure of the head/disk interface. Given the capabilities of conventional manufacturing methods, in order to maintain adequate clearance between the load beam and flange, allowable tolerances would be practically unrealizable.

Thus, a hitherto unsolved need has remained for a load beam having features which limit displacement of the slider from the disk while compensating for manufacturing and assembly tolerances so as not to create collisions/interference between the load beam and flanged disk spacers.

SUMMARY OF THE INVENTION

The present invention relates to an impact reducing feature formed on a suspension assembly, for supporting a read/write slider in a disk drive, which limits the displacement of the slider from a surface of a disk when the slider is parked in a parking zone.

In one embodiment, a suspension assembly includes a load beam and a flexure. The load beam includes a proximal end, a distal end, stiffening side rails which are formed in a direction away from the slider, and a protrusion formed at the distal end of each of the side rails.

In another embodiment, where either the side rails of the load beam are formed toward the slider, or the load beam is formed without side rails, a dimple is formed on the load beam, along its longitudinal axis, in a direction away from the slider.

In either embodiment, the suspension assembly of the present invention is utilized in a disk drive having an annular flange circumferentially defined about a disk clamp, a disk spacer and/or motor hub. Each of the annular flanges being substantially parallel to the disk surface and spaced a distance from the surface to enable the suspension assembly to park the slider within the parking zone. In this arrangement, displacement of the slider from the disk surface may be limited while compensating for any vertical stack-up of the E-block. Thus interference between the load beam and the flange is also minimized to effectively minimize the possibility of collision therein between, thereby preventing debris from being generated.

These and other advantages of the present invention will become apparent upon reading the following detailed descriptions and studying the various figures of the drawings.

BRIEF DESCRIPTION OF THE DRAWINGS

FIG. 1b is a detailed view of the slider-gimbal interface of FIG. 1a.

FIG. 4a is a partial cross-sectional view of the suspension assembly of FIG. 2, assembled with a flanged disk clamp and a disk, illustrating the clearance between the load beam and the flange.

FIG. 4b illustrates the clearance shown in FIG. 4a, when assembly tolerance is considered.

FIG. 6b is a magnified side view of the distal end of the suspension assembly of FIG. 6a.

FIG. 7a is a partial cross-sectional view of the suspension assembly of FIG. 6a, assembled with a flanged disk clamp and a disk, illustrating the clearance between the load beam and the flange.

FIG. 7b illustrates the clearance shown in FIG. 7a, when assembly tolerance is considered.

FIG. 8b is a side view of the distal end of the suspension assembly of FIG. 8a.

FIG. 11 is a plan view of an impact dimple formed on a suspension assembly having a load beam without side rails.

DETAILED DESCRIPTION OF THE PREFERRED EMBODIMENTS

The present invention described herein is for a suspension arm assembly for use in disk drives. In the following description, numerous specific details are set forth in order to provide a thorough understanding of the present invention. It will be apparent, however, to one skilled in the art, that the present inventions may be practiced without some or all of these specific details. In other instances, well known structures and/or process steps have not been described in detail in order not to unnecessarily obscure the present invention.

Figure 6A:
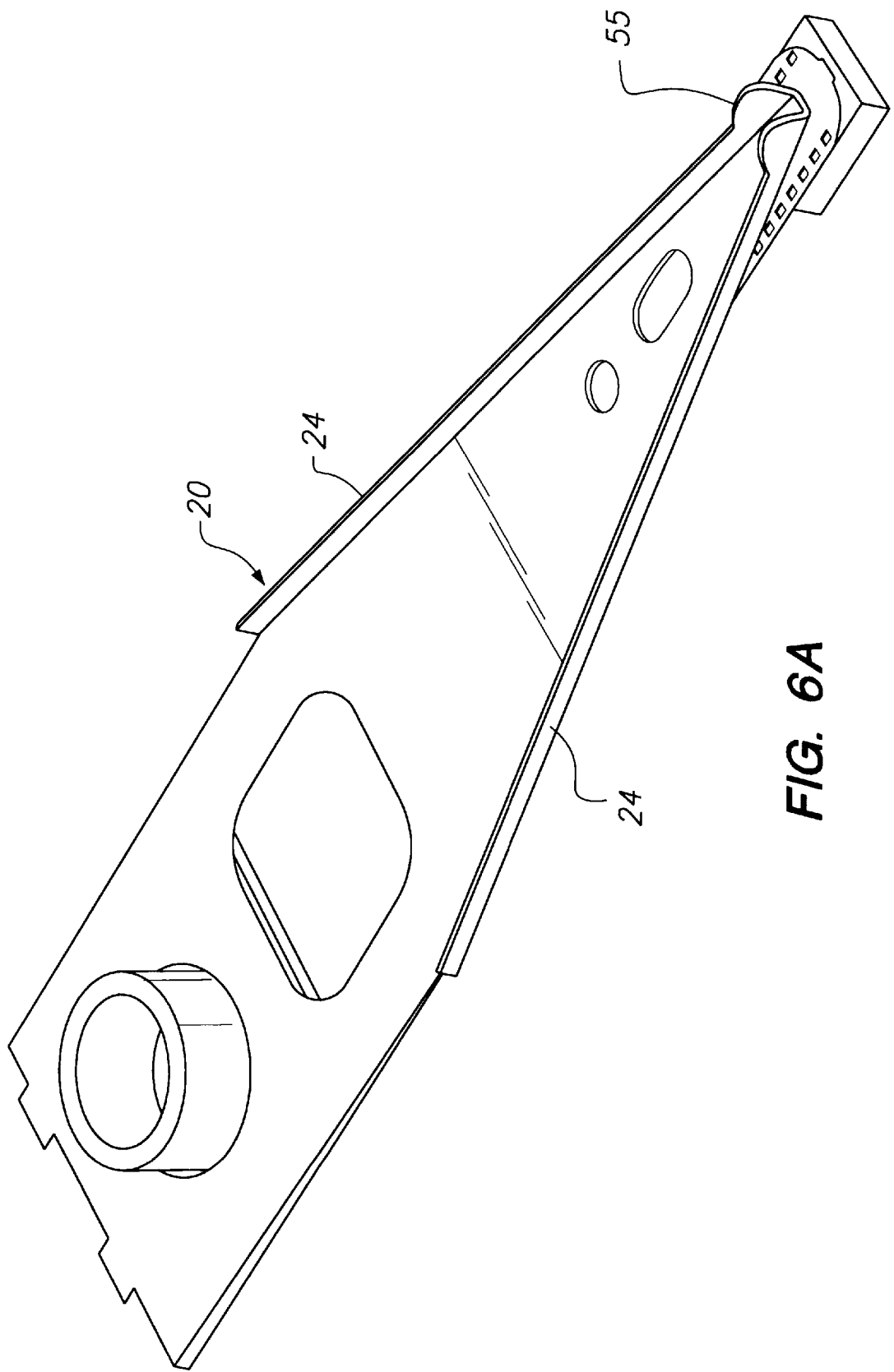
FIG. 6a is a plan view of impact protrusions formed on the suspension assembly of FIG. 2, in accordance with principles of the present invention.
Figure 7C:
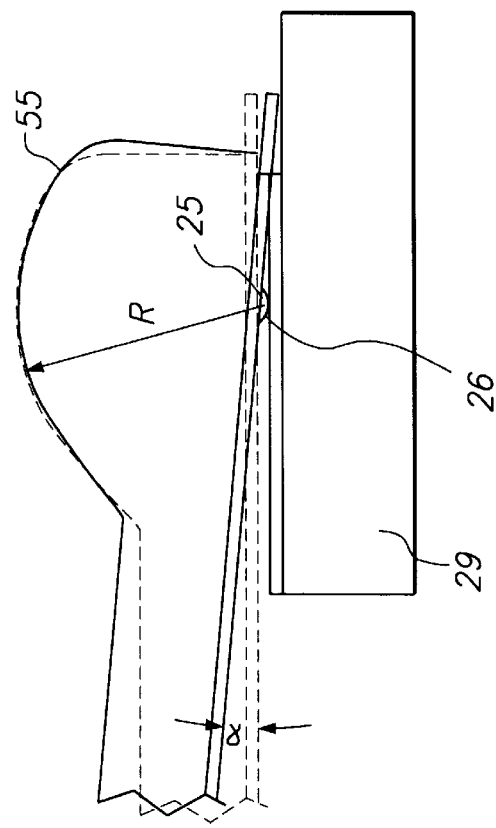
FIG. 7c is a magnified view of a distal end of the suspension assembly shown in FIG. 7b.
Figure 6B:
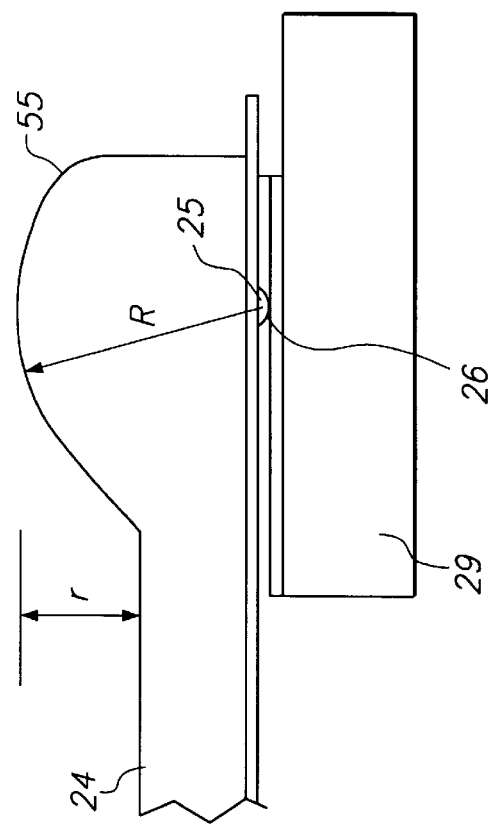

In one preferred embodiment, the present invention is shown in FIG. 6a, wherein an impact protrusion 55 is formed at the distal end of each up-rail 24 of load beam 20. The magnified view of FIG. 6b shows in detail that the protrusion is preferably generally semi-circular in shape and is integrally formed with the up-rails 24. The protrusion is preferably defined by a radius of curvature R, as measured from a contact point 26 between the load dimple 26 and slider 29. Contact point 26 also defines a "center of rotation" of load beam 20, when vertical stack-up is introduced. The center of rotation is an effect resulting from vertical stack-up, which tends to displace the load beam 20 in the vertical direction, and the preload force, which tends to bias the distal end from displacement away from the disk surface. The resulting effect is illustrated in FIG. 7c, wherein load beam 20 has been rotated, from the position shown in FIG. 6b, through an angle α, about contact point 26. Thus, the advantage of defining R from contact point 26 is that clearance c remains unchanged when vertical stack-up is introduced since contact point 26 coincides with the center of rotation.

The advantages of the present invention may be more clearly understood by examining the following dimensions shown in FIG. 7a: stack-up height h, clearance i, defining the distance between the up-rail 24 and spacer flange 12b having a thickness of t', and clearance c, defining the distance between impact protrusion 55 and the flange 12b. Thickness t' represents a reduced flange thickness t of the prior art, shown in FIG. 4a, to effectively create an increased clearance i. Preferably, t' is half the thickness of t. Clearance i is sufficient to prevent interference between the flange 12b and up-rail 24 due to stack-up. Therefore, the reduced flange thickness t' compensates for stack-up while the impact protrusions 55 limit slider displacement from the disk surface. It should be understood that without protrusions 55, reduced thickness t' undesirably creates a sufficiently large enough clearance c to enable head slap.

Figure 1A:
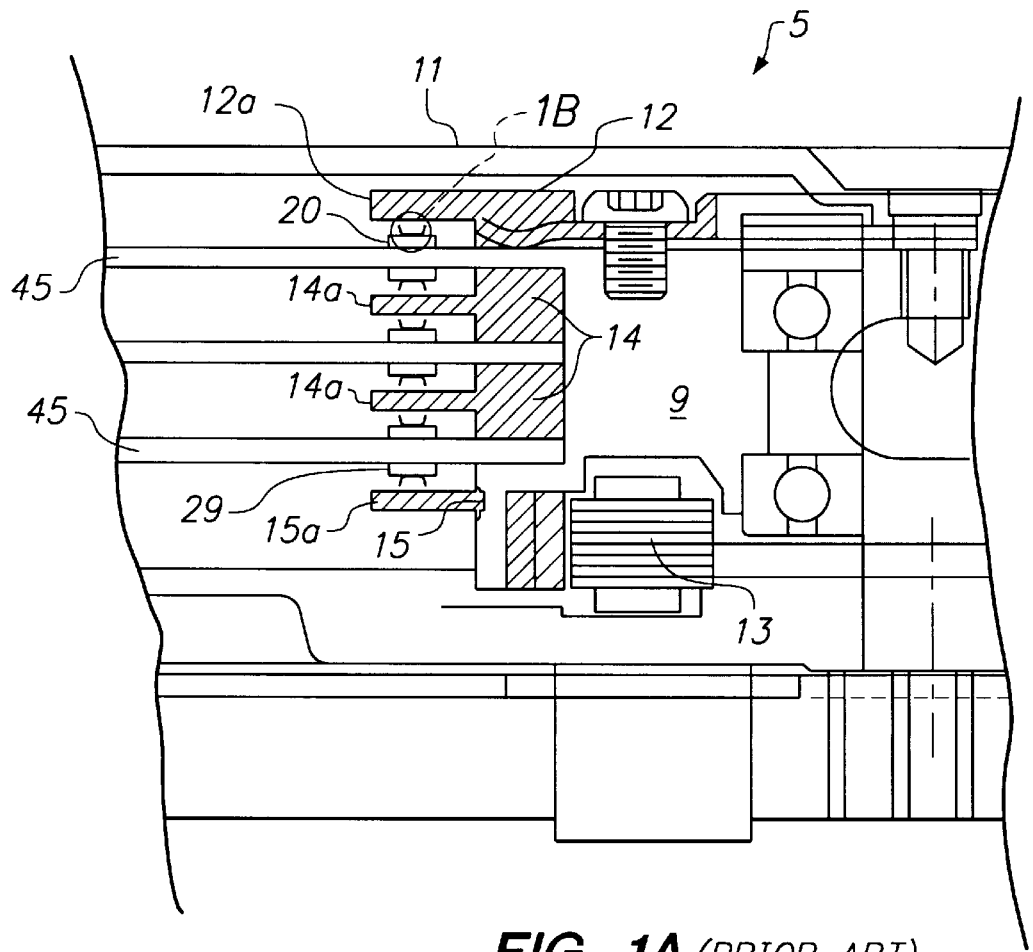
FIG. 1a is cross-sectional view of a section of a prior art disk drive having multiple disks and flanges spacers.
Figure 1B:
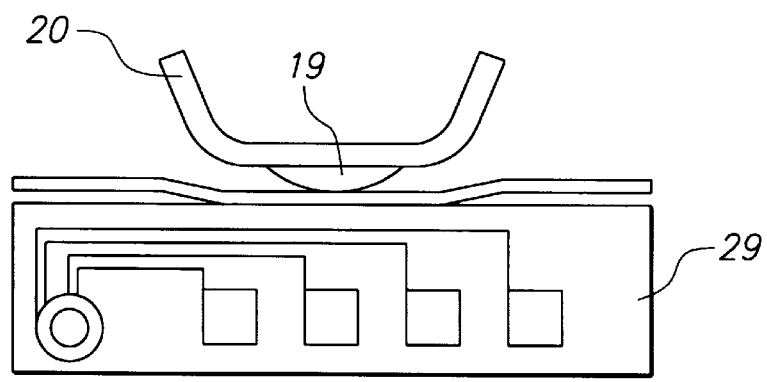
Figure 2:
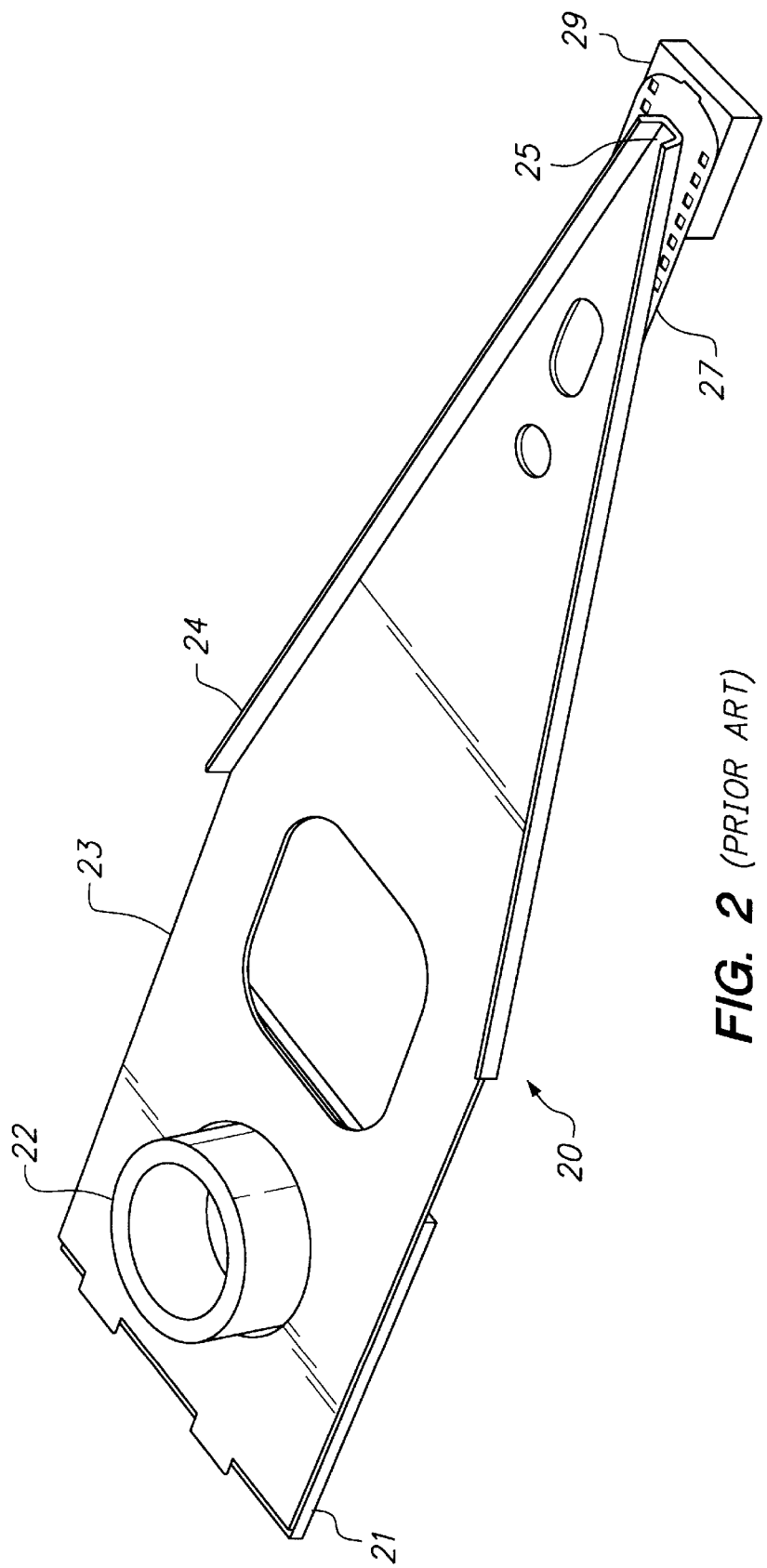
FIG. 2 is a plan view of a prior art suspension assembly having up-rails.
Figure 3:
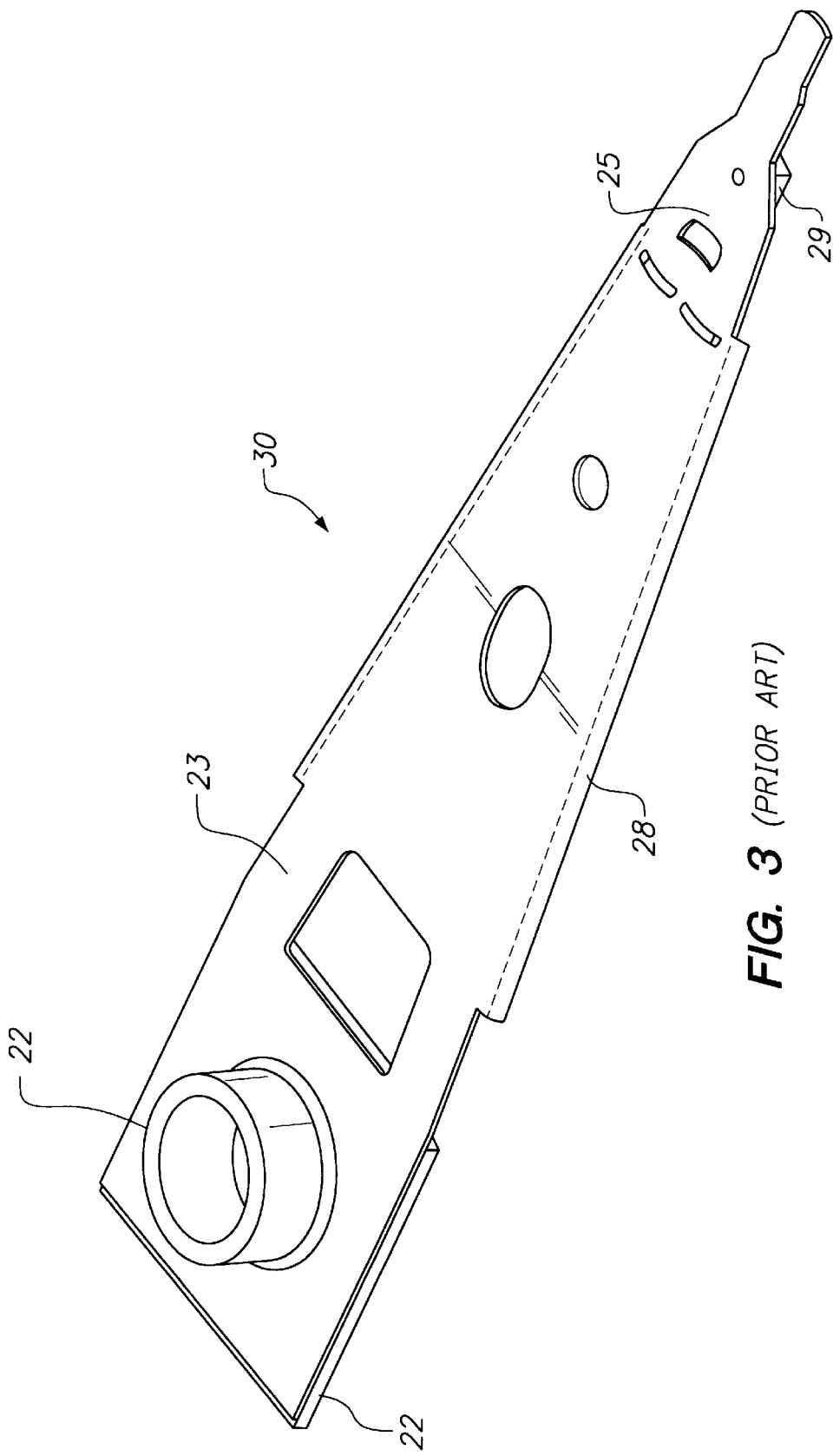
FIG. 3 is plan view of a prior art suspension assembly having down rails.
Figure 5A:
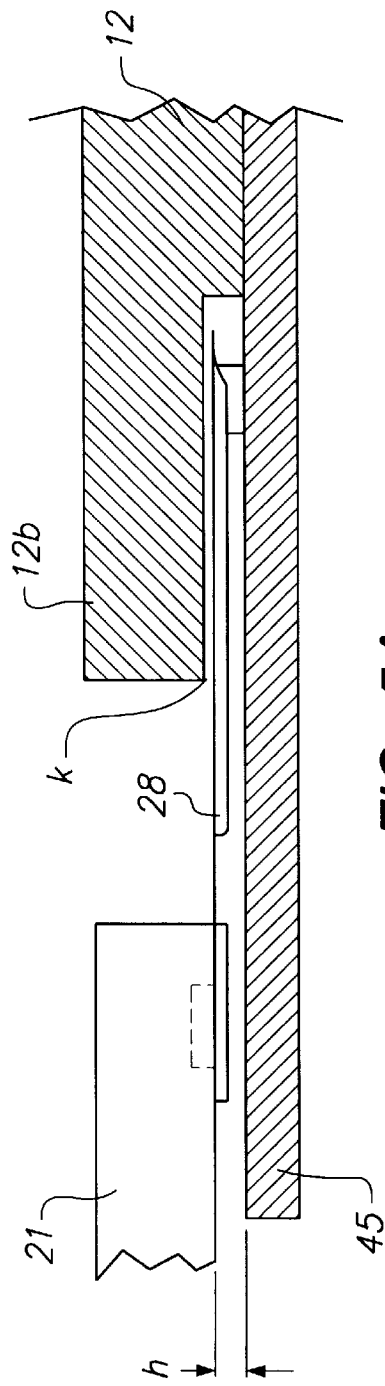
FIG. 5a is a partial cross-sectional view of the suspension assembly of FIG. 3, assembled with a flanged disk clamp and a disk, illustrating the clearance between the load beam and the flange.
Figure 5B:
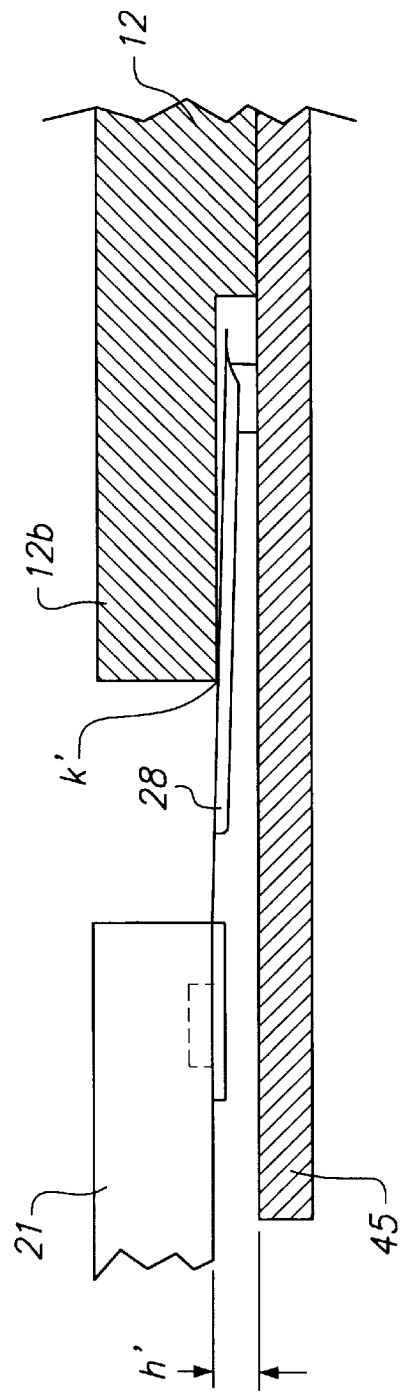
FIG. 5b illustrates the clearance shown in FIG. 5a, when assembly tolerance is considered.

Referring back to FIG. 4b, notice that a similar increase to clearance j' may have been achieved in the prior art assembly by simply decreasing the thickness t of the flange 12b. However, without the impact protrusion, the space between the flange 12a and up-rail 24 would also increase, resulting in excessive head slap. A similar consequence results in the down-rail of FIG. 5b. Thus, the dimensions of the impact protrusion and flange thickness may be optimized to minimize displacement of the slider from the disk, while compensating for stack-up, so as to prevent detrimental contact between the load beam and flange.

Those skilled in the art will understand that impact protrusion 55 may be conveniently etched and formed with the fabrication of the up-rail load beam 20. Impact protrusion 55 is formed near, but not coincident with load dimple 25. While chemical etching is presently most preferred, other forming methods, such as stamping, ion milling, micromachining, etc., may also be employed.

Figure 8A:
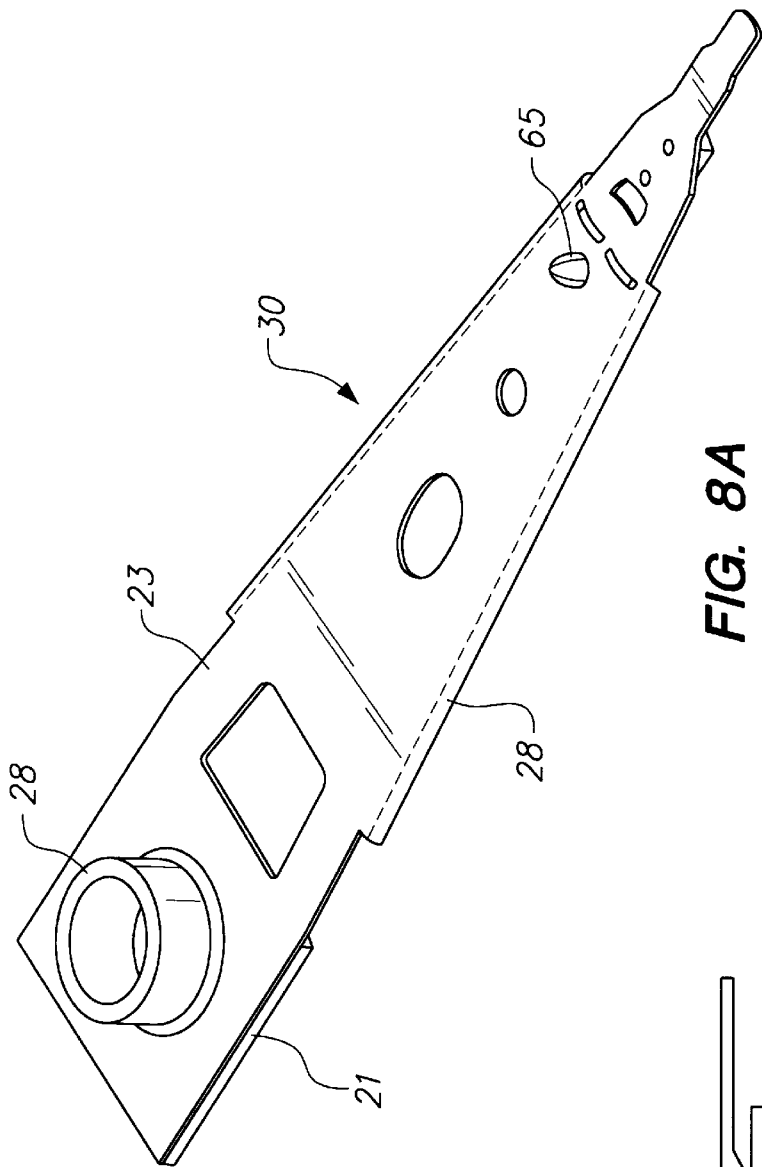
FIG. 8a is a plan view of an impact dimple formed on the suspension assembly of FIG. 3, in accordance with principles of the present invention.
Figure 8B:
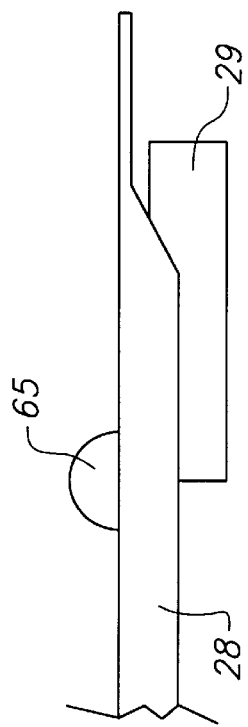
Figure 9A:
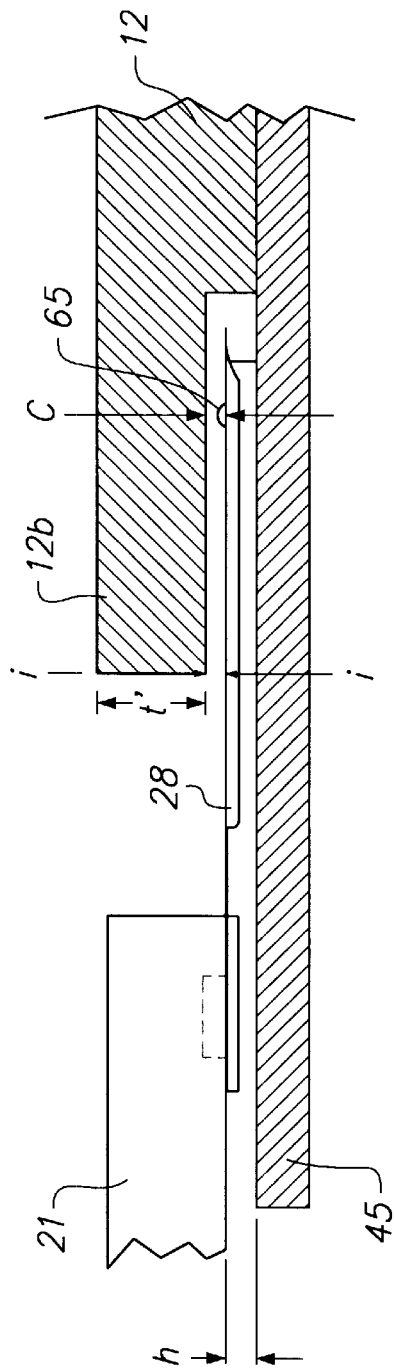
FIG. 9a is a partial cross-sectional view of the suspension assembly of FIG. 8a, assembled with a flanged disk clamp and a disk, illustrating the clearance between the load beam and the flange.
Figure 9B:
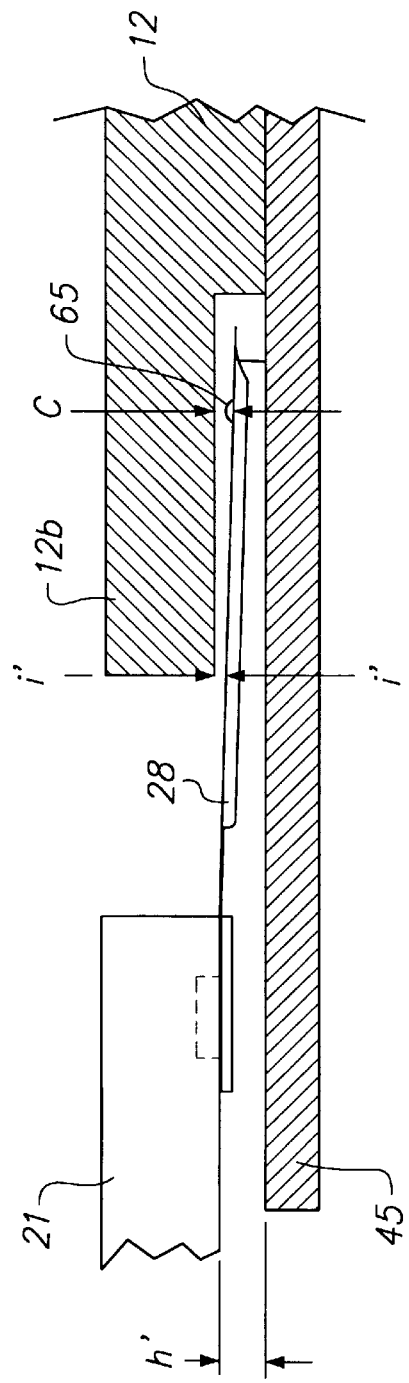
FIG. 9b illustrates the clearance shown in FIG. 9a, when assembly tolerance is considered.

An alternative embodiment of the present invention is shown in FIG. 8a. By way of example, in a down-rail load beam 30, an impact feature is defined as a dimple 65 formed away from slider 29, towards the flange. As illustrated in FIG. 8b, the impact dimple 65 is preferably generally spherical shaped, positioned along a longitudinal axis of the suspension, in close proximity to the load dimple 25. Note that impact dimple 65 is preferably formed as close to load dimple as manufacturably possible. This way, any decrease to clearance c, resulting from rotation of the load beam due to vertical stack-up, may be minimized. FIGS. 9a and 9b show similar advantages of forming an impact dimple 65 on a down-rail load beam 30, wherein a sufficient clearance i' minimizes the possibility of collision between the load beam 30 and the flange 12b. At the same time head slap is prevented as clearance c, defined between dimple 65 and flange 12b remains relatively unchanged.

FIG. 11 shows yet another embodiment of the present invention, where an impact dimple 85 is formed in a rail-less load beam 80. The impact dimple 85 is similarly formed and shaped as the impact dimple 65 formed into load beam 30, shown in FIG. 8a. Load beam 80 is generally identical to load beam 30 with the exception that load beam 80 is fabricated without stiffening side rails. Thus the advantages discussed above with respect to dimple 65 apply.

Referring back to FIG. 7a, a mathematical representation of the relationship between the protrusion height r and the clearance i, may be given by $$i=(r+c)-S\theta \qquad (1)$$

wherein S represents the length of the load beam 20 parked under the flange 12a and $\theta$ (not shown) represents the angle of rotation of load beam 20 from its initial (non-toleranced) position, with respect to a horizontal axis, due to stack-up. Assuming the worst case, wherein the load beam contacts the flange (i=0), maximum allowable vertical stack-up h can be represented by $$h=(L/S)c+L(r/s-\theta) \qquad (2)$$

wherein L represents the effective length of the load beam 20.

If $\theta$ is sufficiently small (i.e. for a nearly horizontal load beam, tan $\theta<<r/s$) Eq. 1 reduces to $$h=(L/S)c+L(r/S) \qquad (3)$$

Figure 10:
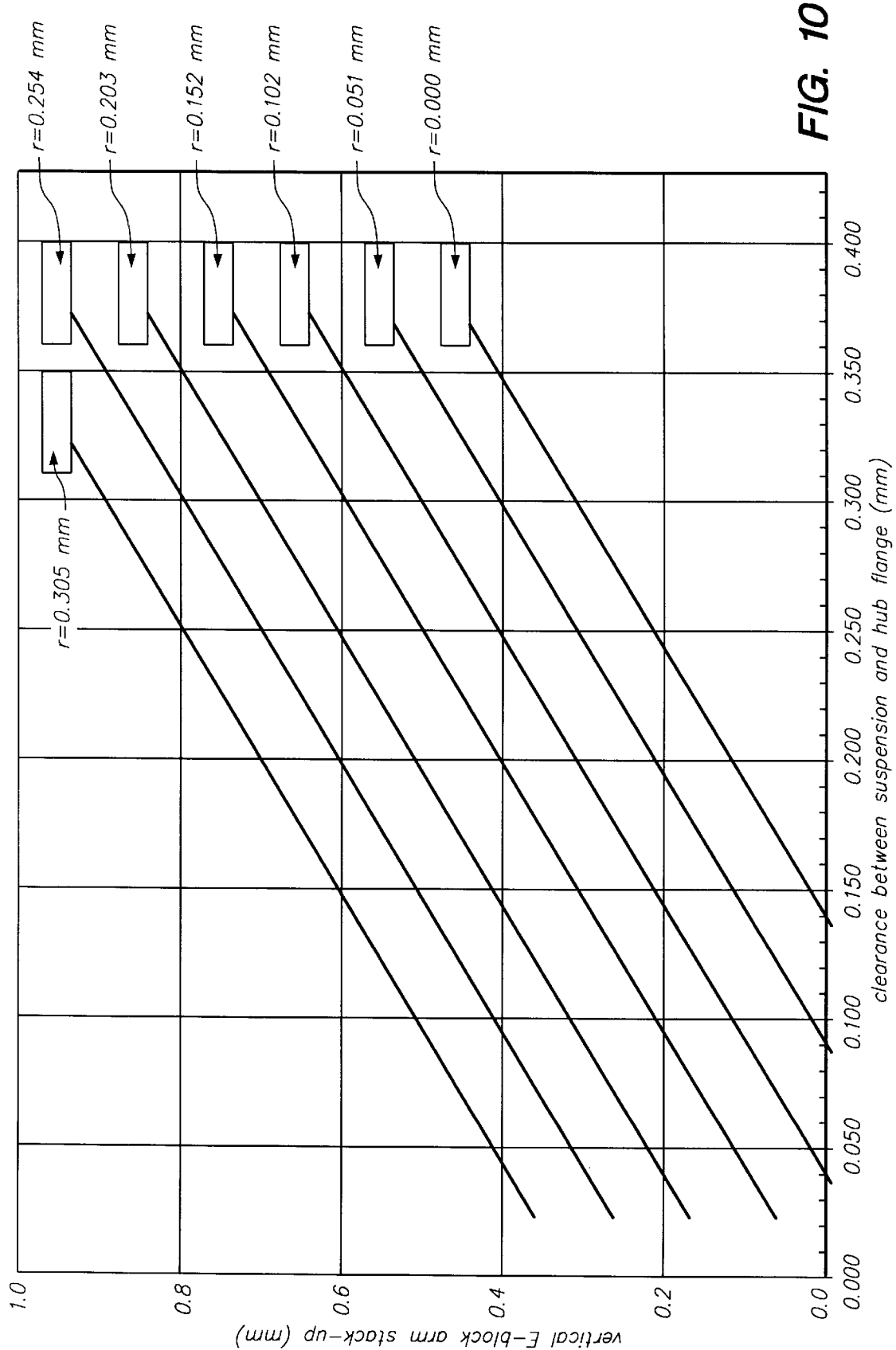
FIG. 10 is a plot illustrating the relationship of clearance between suspension and flange vs. stack-up, with various protrusion heights.

Eq. 3 is represented in graphical form in FIG. 10, showing various protrusion heights, r, and using typical suspension parameters of L=15.5 mm and S=8.0 mm. The vertical axis shows the maximum tolerable z-height shift (stack-up) h of the E-block arm before an interference results between the up rail 24 and flange 12b. Based on the plot of FIG. 10, it is evident that clearance c and allowable stack-up h of the E-block arm are directly related as are the impact feature height r and the allowable stack-up h. For example, assuming a clearance c=0.20 mm, a protrusion 55 having a height r=0.10 mm would increase the tolerable stack-up from approximately h=0.10 mm (r=0, no protrusion) to approximately h=0.30 mm. Accordingly, tolerable stack-up increases as the protrusion height increases. Similarly, allowable stack-up increases as clearance c increases.

The inventors of the present invention have found that head slap may be minimized by limiting the clearance c between the protrusion 55 and the flange 12b to approximately 0.20–0.25 mm. Assuming a typical maximum assembly tolerance of 0.40 mm in the vertical E-block arm stack-up, FIG. 10 shows that it is preferable to form each protrusion 55 with a height r of approximately 0.10–0.15 mm.

While the above described equations were described with respect to an up rail suspension, Eqs. 1, 2 and 3 are applicable for the down rail suspension of FIG. 8a as well.

In either of the above described embodiments, the impact features are located along the load beam longitudinal axis, in close proximity to a rotational center of the load beam. The rotational center is located along the "pitch axis", i.e. the axis transversely perpendicular to the longitudinal axis of the load beam, also known as the "roll axis". Since the load beam preload force urges the slider against the disk surface, such that the slider maintains contact with the disk at the landing zone when the drive is not in operation, clearance c remains relatively unchanged as the load beam rotates due to disk and arm stack-up.

It should be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A suspension assembly for supporting a slider in a disk drive having at least one disk comprising:
   a load beam including
      a distal end;
      a proximal end;
      impact reducing means disposed toward the distal end of the load beam for limiting vertical displacement of the slider from a disk surface, the impact reducing means extending vertically from the load beam; and
   a flexure for attaching the slider and imparting a preload force thereon.

2. The suspension of claim 1 further comprising stiffening side rails.

3. The suspension assembly of claim 2, wherein the impact reducing means comprises a protrusion extending vertically from each stiffening side rail, the side rails extending in the same direction as the at least one protrusion.

4. The suspension assembly of claim 2, wherein the impact reducing means comprises at least one dimple extending vertically along a longitudinal axis of the load beam, the load beam having side rails formed toward the disk surface.

5. The suspension of claim 4 wherein the at least one dimple extends in a direction opposite the side rails and in proximity to a head gimbal.

6. The suspension of claim 1 wherein the impact reducing means comprise a dimple extending vertically from the load beam along a longitudinal axis of the load beam.

7. In a disk drive having at least one disk, an apparatus for limiting vertical displacement of a slider from a disk surface comprising:
   a suspension assembly for positioning the slider in close proximity to the disk surface, the suspension assembly comprising:
      a load beam including a distal end and a proximal end; and
      a flexure for supporting the slider, the flexure attached to the load beam;
      at least one annular member, each annular member being concentrically disposed about the surface of the disk
      a circumferential flange extending radially from each of the at least one annular member, the circumferential flange having a contact surface substantially parallel to the disk surface, the distal end of the suspension assembly being positionable between the disk surface and the circumferential flange such that a gap is defined between the distal end of the load beam and the contact surface;

impact reducing features disposed toward the distal end of the load beam such that the gap is reduced.

8. The apparatus of claim 7 wherein the load beam further includes side rails such that the impact reducing features extend vertically from each side rail.

9. The apparatus of claim 7 wherein the impact reducing features comprise a dimple extending vertically in a direction away from the slider and along a longitudinal axis of the load beam.

10. A disk drive comprising:

a supporting base structure;

at least one rotatable disk;

means for rotatably supporting the disk about the supporting base structure;

at least one suspension assembly, each suspension assembly including a load beam having side rails, for resiliently supporting a slider adjacent a surface of the disk;

an actuator for radially positioning the suspension assembly adjacent the surface of the disk;

impact reducing means disposed toward a distal end of the load beam for limiting vertical displacement of the slider from the disk surface; and at least one annular member concentrically disposed on the disk, the annular member including a circumferential flange having a contact surface substantially parallel to and spaced apart from the disk surface for the actuator to position the suspension assembly therein between such that the impact reducing means reduces a gap defined between the distal end of the load beam and the contact surface.

11. The disk drive of claim 10, wherein the impact reducing means comprises a dimple extending vertically from the load beam, along a longitudinal axis.

12. The disk drive of claim 10, wherein the impact reducing means comprise a dimple extending vertically from the load beam, along a longitudinal axis of the load beam wherein the side rails are down rails.

13. The disk drive of claim 12 wherein the dimple extends in a direction opposite the side rails and in proximity to a head gimbal.

14. The disk drive of claim 10 wherein the impact reducing means comprise a protrusion extending vertically from each stiffening side rail, the side rail being an up rail.

15. The disk drive of claim 14 wherein the protrusion extends in the same direction as the side rails.

16. The disk drive of claim 14 wherein the protrusion is generally semi-circular shaped.

17. A method of manufacturing a disk drive comprising the steps of:

rotatably mounting at least one data storage disk onto a base structure;

providing at least one suspension assembly, each suspension assembly including a load beam having stiffening side rails, impact reducing means disposed toward a distal end of the load beam for limiting vertical displacement of the slider from a disk surface;

attaching an actuator for radially positioning the suspension assembly over the disk surface; and inserting at least one annular member concentrically about the disk, the annular member including a circumferential flange having a contact surface substantially parallel to and sufficiently spaced from the disk surface to position the load beam therein between such that the impact reducing means reduces a gap defined between the distal end of the load beam and the contact surface.

* * * * *